United States Patent [19]
Jessee

[11] 3,878,954

[45] Apr. 22, 1975

[54] BOAT LOADER AND UNLOADER FOR CAMPER BODY

[76] Inventor: John W. Jessee, 2481 Roland Rd., Sacramento, Calif. 95821

[22] Filed: July 5, 1973

[21] Appl. No.: 376,376

[52] U.S. Cl.............................. 214/450; 214/77 R
[51] Int. Cl............................................. B60n 9/00
[58] Field of Search........ 214/450, 77 R; 254/139.1; 9/1 R, 1 T; 224/42.1 H

[56] References Cited
UNITED STATES PATENTS

| | | | |
|---|---|---|---|
| 3,128,893 | 4/1964 | Jones.................................. | 214/450 |
| 3,343,696 | 9/1967 | Morrison............................ | 214/450 |
| 3,387,727 | 6/1968 | Micheel............................. | 214/450 |
| 3,531,006 | 9/1970 | Farchmin........................... | 214/450 |
| 3,716,156 | 2/1973 | Risney.............................. | 214/450 |

*Primary Examiner*—Albert J. Makay
*Assistant Examiner*—Jerold M. Forsber
*Attorney, Agent, or Firm*—Clarence A. O'Brien; Harvey B. Jacobson

[57] ABSTRACT

The invention is to be used in conjunction with a vehicle having generally vertically spaced upper and lower marginal edge portions such as the upper rear marginal edge of a camper body supported from the load bed of a pickup truck including a lower marginal edge disposed generally vertically beneath the rear upper edge of the camper body. Horizontal elongated support means is provided for support along the upper marginal edge portion of the camper body slightly above the latter and an elongated support arm structure has one end pivotally supported from the lower marginal portion of the rear of the pickup truck bed for generally vertical swinging of the other end portion of the support arm structure between a position with the support arm structure generally horizontally disposed and the other free end thereof projecting outwardly to the rear of the lower marginal edge portion of the truck and an upstanding position with the free end of the support arm structure swung upwardly to a position adjacent the upper marginal edge portion of the camper body. Structure is provided at the free end of the support arm structure for attachment to one end of a boat and the free end portion of the support arm structure is supported from the remainder of the support arm structure for lengthwise extension and retraction relative thereto outwardly of a limit position of retraction to the support arm structure.

15 Claims, 12 Drawing Figures

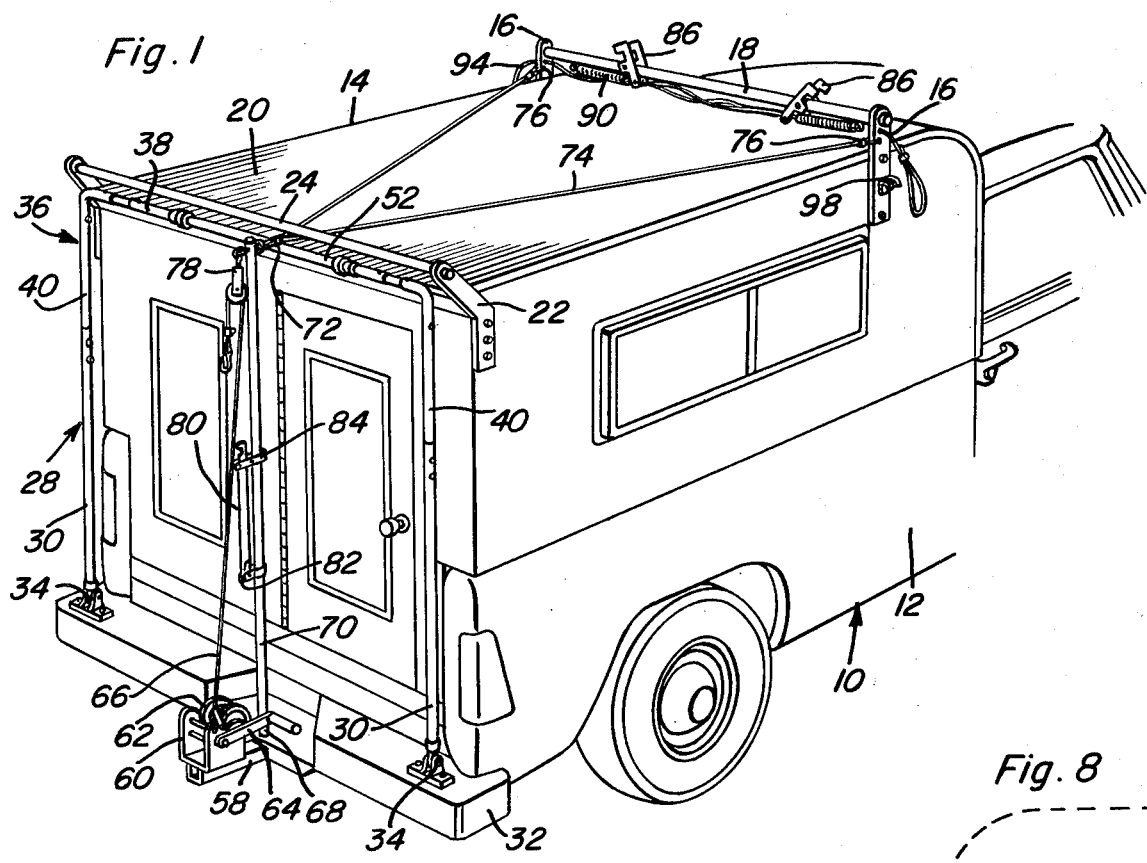
Fig. 1
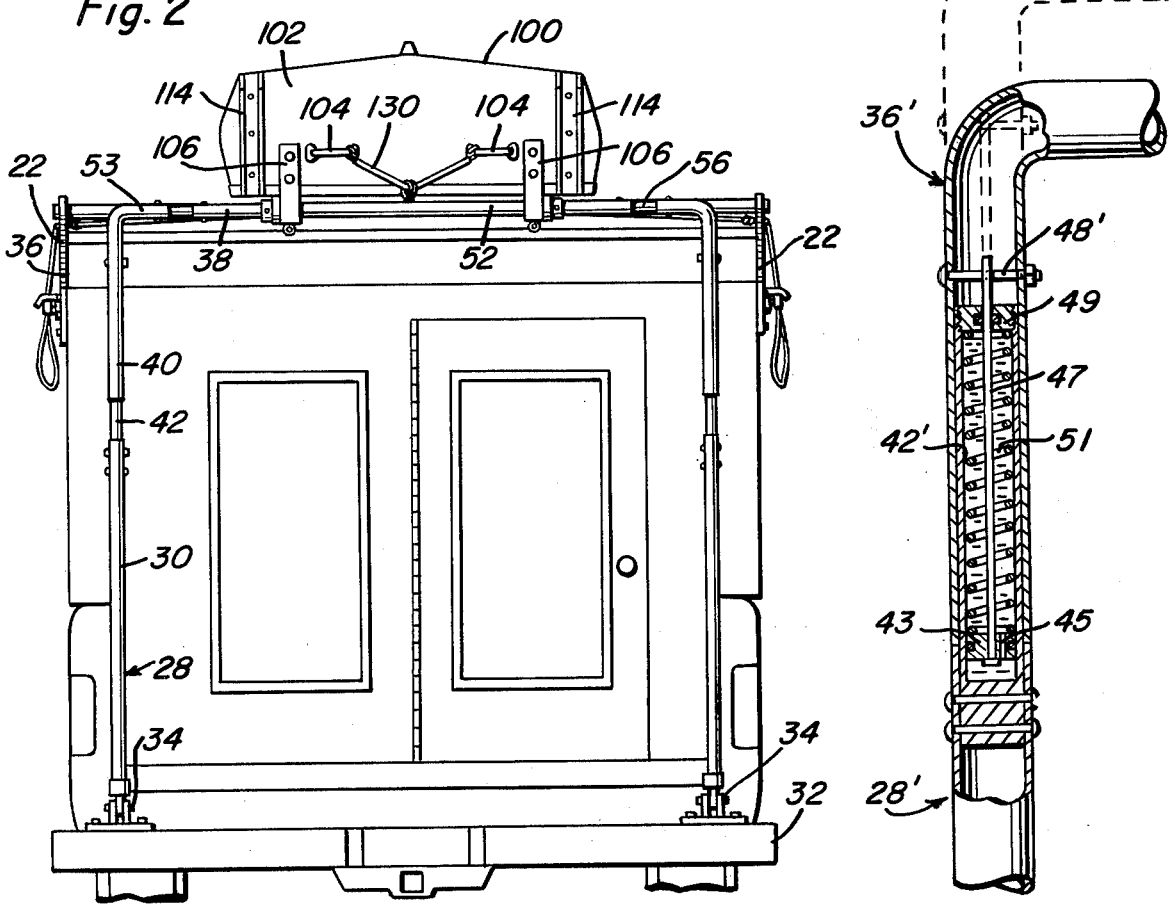
Fig. 2
Fig. 8

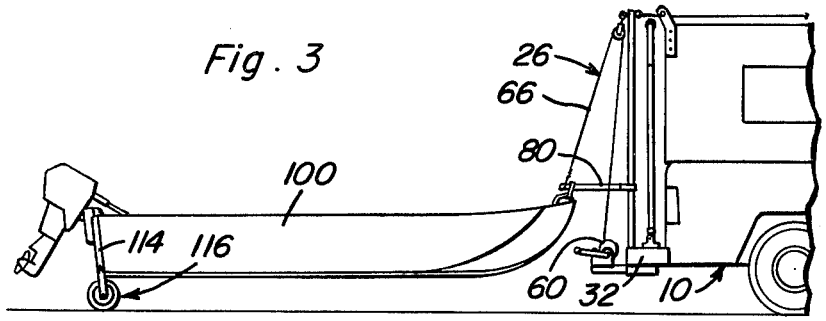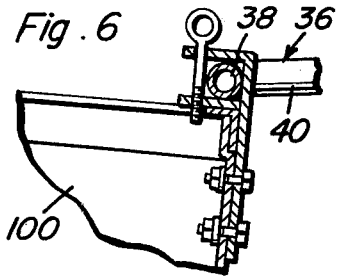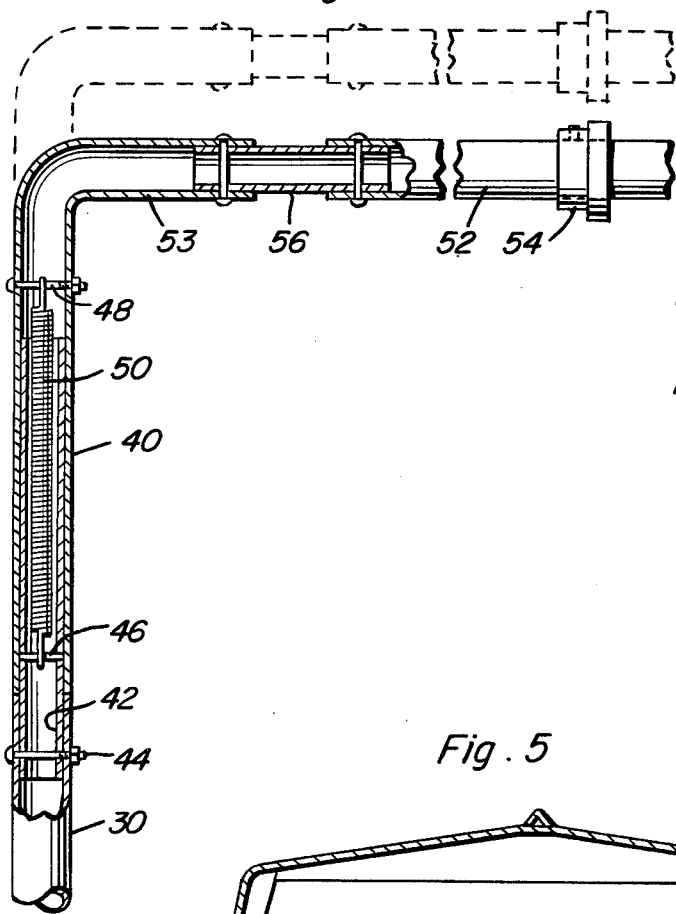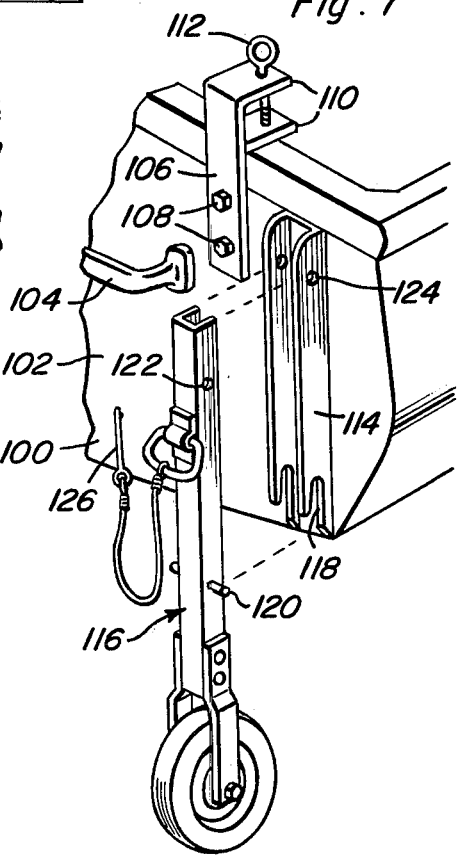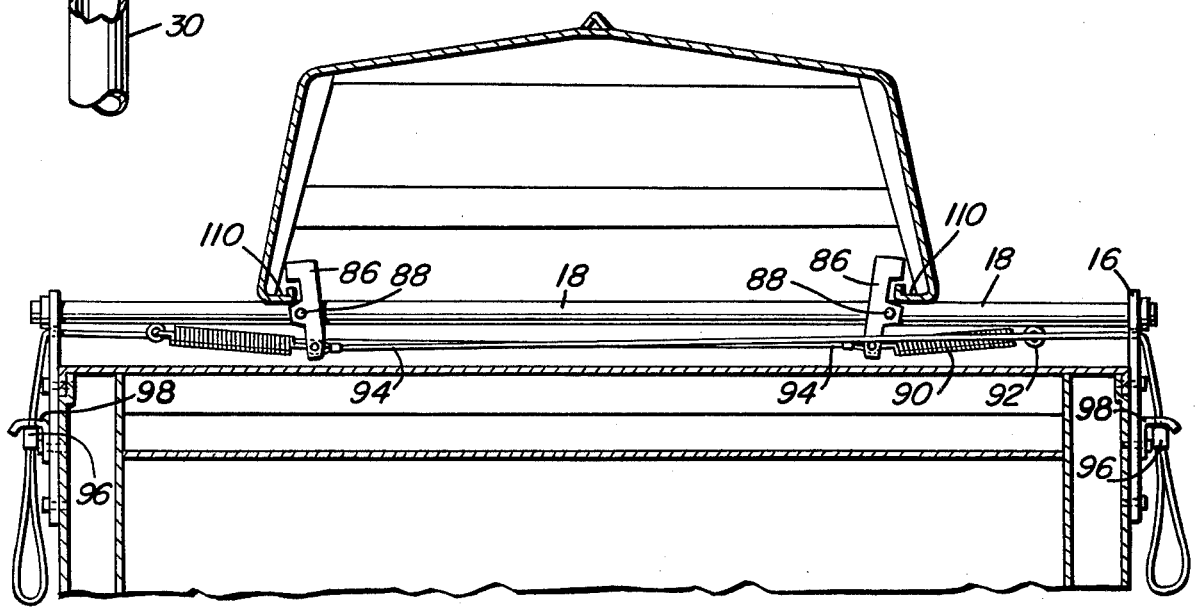

BOAT LOADER AND UNLOADER FOR CAMPER BODY

The boat loader and unloader of the instant invention has been primarily designed for use in conjunction with high top recreational vehicles such as a pickup truck equipped with a camper body. The loader and unloader is designed to facilitate the loading of a boat on top of the high top recreation vehicle and the latter may also comprise a motor home or the like.

The main object of this invention is to provide a means by which a boat in the 150 – 300 pound class or even somewhat heavier and up to 16 feet in length may be mechanically loaded onto and unloaded from the roof of a high top recreation vehicle such as a camper body equipped pickup truck.

Another object of this invention, in accordance with the immediately preceding object, is to provide a boat loader and unloader which may be readily utilized by a single person in loading a boat onto the top of a high top recreational vehicle and unloading a boat from atop the recreation vehicle.

Another important object of this invention is to provide a boat loader and unloader including removable wheels for attachment to the associated boat and means by which the removable wheels and loader and unloader may be utilized to convert the boat into a self-supporting trailer for movement into and out of the water at a ramp after the boat has been unloaded from the recreation vehicle.

A further important object of this invention is to provide a support structure for supporting a boat on top of a recreation vehicle and including means by which the boat may be conveniently locked in position on the support structure.

Yet another object of this invention is to provide a boat loader and unloader in accordance with the preceding objects which will be safe to use and eliminate many of the safety hazards experienced in loading and unloading boats using other previously known devices or methods.

A final object of this invention to be specifically enumerated herein is to provide a boat loader and unloader in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a fragmentary perspective view of a pickup truck having a camper body mounted thereon and with the boat loader and unloader of the instant invention operatively associated with the truck ad the camper body;

FIG. 2 is a fragmentary enlarged rear elevational view of the pickup truck and camper body with a boat supported in inverted position on top of the camper body;

FIG. 3 is a fragmentary side elevational view of the pick up truck and camper body with the boat loader and unloader of the instant invention including the removable boat supporting wheels being utilized to transform the associated boat into a self-supporting trailer;

FIG. 4 is an enlarged fragmentary vertical sectional view illustrating the manner in which the support arm structure of the boat loader and unloader includes an extendable and retractable outer end portion yieldingly biased toward a fully retracted position;

FIG. 5 is an enlarged fragmentary transverse vertical sectional view illustrating the manner in which the boat supporting structure on top of the camper body includes structure for releasably locking the boat to be supported therefrom in position thereon;

FIG. 6 is a fragmentary longitudinal vertical sectional view illustrating the manner in which the free end portion of the support arm structure of the boat loader and unloader may be pivotally attached to the upper edge of the transom of an associated boat;

FIG. 7 is a fragmentary exploded perspective view illustrating the manner in which the removable trailering wheel structure of the instant invention may be supported from an associated boat;

FIG. 8 is an enlarged fragmentary vertical sectional view similar to FIG. 4 but illustrating a modified form of support arm structure.

Figure 9:
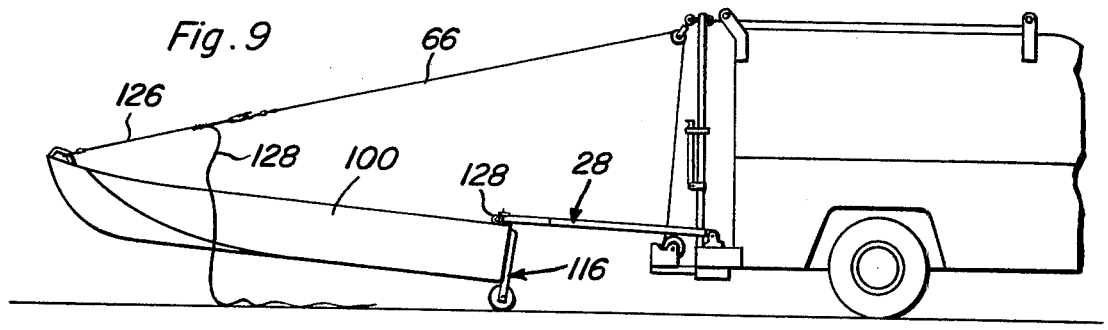
FIGS. 9, 10, 11 and 12 are fragmentary side elevational views illustrating the sequential steps followed in loading a boat on top of the camper body through the utilization of the boat loader and unloader of the instant invention.

Referring now more specifically to the drawings, the numeral 10 generally designates a conventional form of pickup truck including a load bed 12 from which a conventional form of camper body 14 is supported.

The forward opposite side corner portions of the camper body 14 are provided with brackets 16 attached to the upper side wall portions of the camper body 14 and a horizontal support bar 18 extends between and is supported from the brackets 16 in slightly elevated position above the roof 20 of the camper body 14. In addition, a pair of opposite side rear brackets 22 are supported from the rear of the camper body 14 on the upper portions of the side walls thereof and a second support bar 24 extends between and is journaled from the brackets 22.

The support brackets 16 and 22 as well as the support bars 18 and 20 comprise components of the boat loader and unloader of the instant invention which is referred to in general by the reference numeral 26. The loader and unloader 26 further includes an elongated support arm structure referred to in general by the reference numeral 28 and which is in the form of a pair of generally parallel arms 30 having one pair of corresponding ends pivotally supported from the bumper 32 of the pickup truck 10 as at 34. A generally inverted U-shaped connecting member referred to in general by the reference numeral 36 and comprising the outer free end portion of the support arm structure 28 includes a horizontal transverse member 38 and a pair of right angled opposite end depending tubular portions 40. The upper ends of the arms 30 have extension sleeves 42 secured therein by means of suitable fasteners 44 and the extension sleeves 42 project upwardly above the upper ends of the arms 30 and have the lower ends of the depending portions 40 slidingly telescopingly engaged thereover. The lower ends of the depending portions 40 are abuttingly engageable with the upper ends of the arms 30 in order to limit retraction of the outer end portion 36 of the support arm structure 28 relative to the remainder thereof and the extensions 42 have anchor pins 46 secured therethrough while the depending portions 40 have anchor pins 48 secured therethrough. A pair of expansion springs 50 are connected between the anchor pins 46 and 48 and thereby yieldingly bias the depending portions 40 to their fully retracted positions relative to the arms 30. The horizontal transverse member 38 of the outer end portion 36 of the support arm structure 28 includes a center section 52 and a pair of collars 54 are pinned to the opposite end portions of the center section 52. The terminal ends of the center section 52 are joined to right angular opposing portions 53 of the depending portions 40 by means of connecting tubular members 56.

In addition, the central portion of the bumper 32 includes a rearwardly projecting support 58 upon which a winch assembly 60 is supported. The winch assembly 60 includes a winding member 62 having a crank 64 operatively connected thereto and the winding member 62 is journaled from the winch assembly 60 and has one end portion of a flexible tension member 66 secured thereto for winding thereon.

The central portion of the bumpere 32 also includes an upwardly opening socket 68 in which the lower end of a standard 70 is seated and the upper end of the standard 70 is releasably attached to the apex portion 72 of a V-shaped bridle 74 disposed over the roof 20 of the camper body 14 and secured at its divergent ends to the bracket 16 as at 76. In addition, the upper end of the standard 70 supports a pulley sheave 78 and a lower portion of the standard 70 includes a short reach arm 80 pivotally supported therefrom as at 82 for swinging between the upstanding position thereof illustrated in FIG. 1 of the drawings and the horizontally rearwardly projecting position thereof illustrated in FIG. 3, the free end of the reach arm 80 being releasably securable in position by means of a spring clip 84 supported from the standard 70 when the reach arm 80 is in its upstanding position.

The horizontal transverse support bar 18 has a pair of latch members 86 pivotally secured thereto as at 88 at points spaced longitudinally therealong and the lower end of each latch member 80 has one end of an expansion spring 90 secured thereto with the other end of the expansion spring 90 being secured to an outboard anchor 92 carried further out on the corresponding end of the support bar 18. Accordingly, the expansion springs 90 yieldingly bias the latches 86 toward positions with the upper ends thereof upwardly convergent. However, a pair of pull cables 94 are secured to the lower ends of the latches 86 and are slidably received through the upper ends of the remote brackets 16 and provided with abutments 96 engageable with slotted anchors 98 carried by those brackets 86. Accordingly, the pull members or tension members 94 may have their looped ends pulled and the abutments 96 engage with the slotted anchor brackets 98 in order to swing the latches toward and lock the latches 86 in operative positions with the upper ends thereof divergent.

With attention now invited more specifically to FIG. 7 of the drawings there may be seen a conventional form of runabout boat 100 including a transom 102 having lifting handles 104 thereon. The opposite side portions of the upper marginal edge of the transom 102 have a pair of brackets 106 secured thereto by means of fasteners 108 and the brackets 106 include parallel flange portions 110 through whose free ends a locking pin 112 may be secured. From FIG. 6 of the drawings it may be seen that the opposite ends of the transverse bar or member 38 may be releasably journaled from the brackets 106.

In addition, the opposite ends of the transom 102 have channel shaped brackets 114 secured thereto and removable trailering wheel assemblies generally referred to by the reference numerals 116 are removably supportable from the bracket 114. The lower ends of the brackets 114 each define a pair of downwardly opening nothces 118 in which the opposite ends of a lower transverse pin 120 carried by the corresponding trailering wheel assembly 116 are receivable. The upper end of the trailering wheel assembly 116 includes horizontally aligned transverse bores 122 which are registrable with the corresponding transverse bores 124 formed in the flanges of the bracket 114 and through which a lockpin 125 tethered to the corresponding trailering wheel assembly 116 may be releasably secured.

Figure 10:
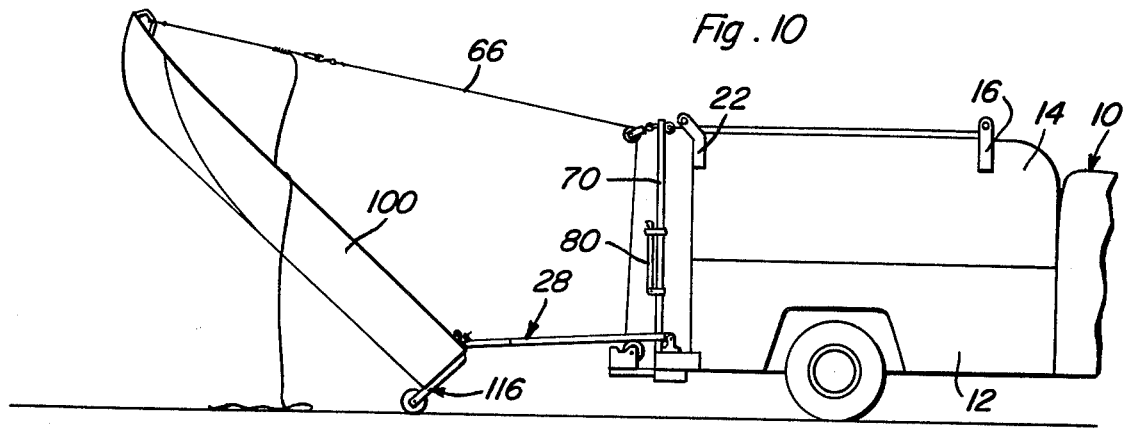
Figure 11:
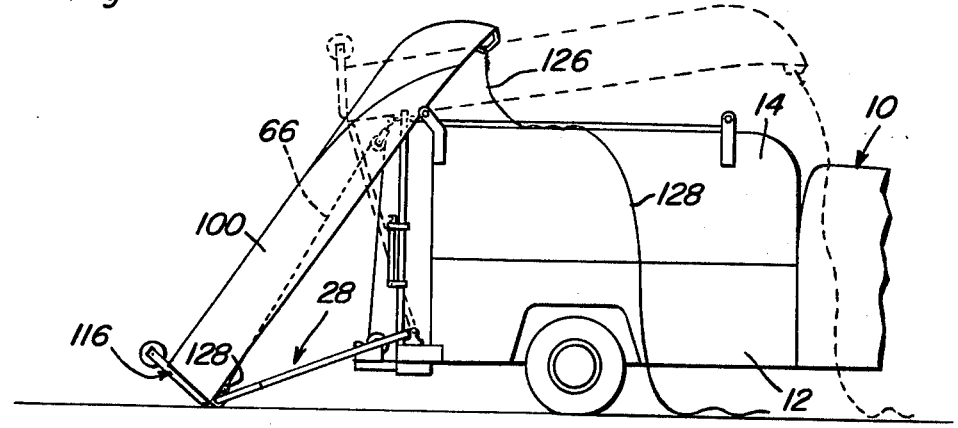

In operation, the bow of the boat 100 is provided with a conventional short bowline 126 and the trailering wheel assemblies 116 are supported from the transom of the boat 100 as illustrated in FIGS. 7 and 9. Further, the cross member 38 of the support arm structure 28 is pivotally attached to the brackets 106 in the manner previously described with the boat 100 positioned as illustrated in FIG. 9 of the drawings and the free end of the tension member 66 passed through the pulley sleeve 78 and attached to the free end of the bowline 126. Then a separate pull line 128 is attached to the connection between the tension member 66 and the bowline 126. Thereafter, the winch 60 is actuated to turn the winding member 62 by means of the handle or crank 64 in order to pull the bow of the boat 100 up past the position thereof illustrated in FIG. 10 of the drawings. Thereafter, the pull line 128 is pulled while the upper bow end of the boat 100 is steadied by hand until the boat 100 reaches the over-center position thereof illustrated in FIG. 11 of the drawings with the opposite side gunwales of the boat 100 disposed on support bar 24. Then, after the free end of the winch line or tension member 66 is released from the bowline 126 and attached to a center eye 128 on the transom 102, the winch 60 is further actuated to pull the boat up toward the position thereof illustrated in phantom lines in FIG. 11 of the drawings with the gunwale portions of the boat 100 resting on the support bar 24. As the boat 100 reaches an over-center position with respect to the support bar 24, the bow end of the boat will swing downwardly toward engagement with the forward support bar 18 and the free end portion 36 of the support arm structure 28 will be caused to be extended. As soon as the forward gunwale portions of the boat 100 swing downward into engagement with the support bar 18, continued operation of the winch 60 will pull the boat 100 into the final position thereof illustrated in FIG. 5 of the drawings. Then, the tension member 66 may be disengaged from the eyebolt 128 and a resilient elastic tension member 130 secured between the handles 104 may have its mid-portion releasably secured to the apex portion 72 of the bridle 74 in the manner illustrated in FIG. 2 of the drawings. Further, the lines or tension members 94 may have their looped ends pulled and the abutments 96 thereon engaged with the slotted brackets 98 carried by the brackets 16 thus causing the levers 86 to retentively engage the inner portions of the forward end portions of the gunwales 110 of the boat 100 in the manner illustrated in FIG. 5 of the drawings.

Figure 12:
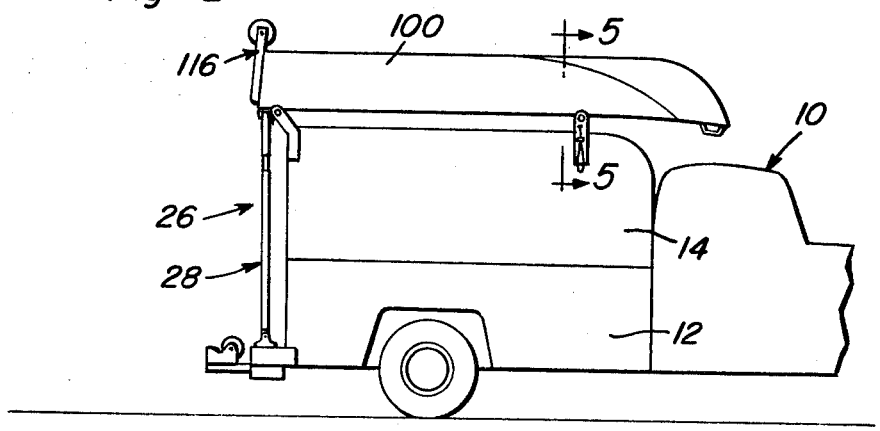

Of course, when it is desired to unload the boat 100, the levers 86 are released and the apex portion of the bridle 74 is released from the tension member 130. Then, the boat 100 is pulled rearwardly until just before the boat is disposed in a center position relative to the support bar 24 and the free end of the tension member 66 is attached to the center eye or eyebolt 128 inboard of the transom at which point the tension member 66 was secured during the loading of the boat 100 in order to pull the boat 100 from the position illustrated in FIG. 11 to the position illustrated in FIG. 12. Then, with but a slight bit of slack in the tension member 66, the boat 100 is manually pulled past the overcenter position in order to tension the tension member 66 and the winch 60 may then be operated in reverse to lower the boat 100 to the ground as illustrated in solid lines in FIG. 11. Thereafter, the free end of the tension member 66 is released from engagement with the transom eyebolt 128 and reattached to the free end of the bowline 126 with some slack in the tension member 66 and the bowline 126. Thereafter, the boat 100 is pushed past the center position away from the rear of the camper body 14 to approximately the position thereof illustrated in FIG. 10 with the tension member 66 and bowline 126 again tensioned. Further operation of the winch 60 may be utilized to lower the boat 100 to the position illustrated in FIG. 9. At this point, the tension member 66 is released from engagement with the bowline 126 and the cross member 38 of the free end portion 36 of the support arm assembly 28 is released from engagement with the brackets 106.

At this point, the boat 100 is completely free of the pickup truck supported structure and the bow thereof may be supported by hand in elevated position above the ground to wheel the boat toward the water. On the other hand, if it is desired to back the boat down a ramp into the water, the reach arm 80 may be swung to the horizontal position thereof illustrated in FIG. 3 of the drawings and attached to the bow of the boat with the free end of the tension member 66 also attached to the free end of the reach arm 80 in order to support the latter in its horizontal position. Then, the pickup truck 10 may be backed down the ramp toward the water in order to launch the boat 100. Of course, after the boat 100 has been rolled back into the water, the bow of the boat 100 is released from engagement with the tension member 66 and the reach arm 80 and the trailering wheel assemblies 116 may be readily removed prior to use of the boat 100. Further, after use of the boat 100, the same orientation illustrated in FIG. 3 may be used to pull the boat 100 from the water and up the ramp before loading the boat back on the truck 10.

With attention now invited more specifically to FIG. 8 of the drawings, there will be seen a modified form of the structure illustrated in FIG. 4 wherein the extension corresponding to the extension 42 is designated by the reference numeral 42' and comprises a tubular member having its upper and lower ends closed. However, a piston 43 is disposed in the extension 42 for sliding movement therein and has a small bypass passage 45 formed therethrough. In addition, a piston rod 47 extends upwardly from the piston 43 and is sealingly and slidably received through an upper end plug 49 formed in the upper end of the extension and secured at its upper terminal end to an anchor pin 48' corresponding to the anchor pin 48. Further, a compression spring 51 is disposed about the piston rod 47 between the piston 45 and the closure plug 49. Thus, the free end portion 36' of the modified support arm structure referred to in general by the reference numeral 28' may be extended and retracted in substantially the same manner as the free end portion 36 of the support arm structure 28, except that a movement dampening means having a movement dampening operation similar to a conventional airplane type shock absorber is provided by the structure illustrated in FIG. 8.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a vehicle including generally vertically spaced marginal portions, horizontal elongated support means extending along said upper marginal portion slightly above the latter and elongated support arm means having one end portion thereof pivotally supported from said lower marginal portion for generally vertical swinging of the other end portion of said support arm means between a position with said support arm means generally horizontally disposed and said other end portion thereof projecting outwardly from said lower marginal portion and an upstanding position with said other end portion swung upwardly to a position adjacent said upper marginal portion, means carried by said other end portion adapted for pivotal attachment to one end of a boat, said other end portion being supported from said one end portion for lengthwise extension and retraction relative thereto, means defining a limit of retraction of said other end portion relative to said arm means and force means connected between said one end portion and said other end portion yieldingly biasing said other end portion toward its limit of retraction.

2. The combination of claim 1 including means defining a limit of extension of said other end portion relative to said arm means.

3. The combination of claim 2 wherein said means defining a limit of extension of said other end portion includes said means yieldingly biasing said other end portion toward its limit of retraction.

4. The combination of claim 1 wherein said other end portion is telescopingly engaged with said arm means and said other end portion is slidable, against the biasing action of said force means, to a position disengaged from said arm means.

5. The combination of claim 1 wherein said arm means comprises a pair of generally parallel arms pivotally attached to said lower marginal portion at points spaced therealong, said other end portion comprising a transverse connecting member extending between the other ends of said arms and slidably supported therefrom.

6. The combination of claim 5 wherein the opposite ends of said transverse connecting member include generally right angled portions slidably engaged with said other ends of said arms.

7. The combination of claim 6 wherein said right angled portions are telescopingly engaged with said other ends of said arms.

8. The combination of claim 7 wherein said right angled portions and said other ends of said arms include coacting means defining a minimum limit of telescopic engagement of said right angled portions with said arms, said force means being connected between said right angled portions and said arms yieldingly urging said right angled portions toward the limit of maximum telescopic engagement with said arms.

9. The combination of claim 1 including an upright standard extending between and supported at its upper and lower ends from said upper and lower marginal portions, guide means carried by the upper end of said standard for guiding a flexible tension member therefrom for lengthwise shifting of said tension member relative to said guide means.

10. The combination of claim 9 including a winding member journaled from said lower marginal portion and having one end portion of a flexible tension member attached thereto, the other end portion of said tension member being releasably guidingly engaged with said guide means.

11. The combination of claim 1 including a pair of support wheel assemblies including means for securing said wheel assemblies to opposite side portions of the transom of a boat.

12. The combination of claim 1 wherein said vehicle includes a top surface extending inwardly from said upper marginal portion, second elongated horizontal support means generally paralleling the first horizontal support means and supported from said vehicle inwardly from said upper marginal portion.

13. The combination of claim 12 wherein longitudinally spaced portions of said second elongated horizontal support means include pivotal boat gunwale engageable latch members operable from the opposite ends of said second elongated support member.

14. The combination of claim 11 wherein said means securing said wheel assemblies to opposite side portions of said transom include coacting means carried by said wheel assemblies and said transom and readily releasable from a position adjacent the upper edge of said transom.

15. The combination of claim 1 including an upright standard extending between and supported at its upper and lower ends from said upper and lower marginal portions, guide means carried by the upper end of said standard for guiding a flexible tension member therefrom for lengthwise shifting of said tension member relative to said guide means, and a V-shaped bridle attached at its apex to the upper end of said standard and with its diverging arms projecting inwardly of said upper marginal portion and attached at their free end portions to adjacent portions of said vehicle.

* * * * *